United States Patent [19]
Pate, Jr.

[11] Patent Number: 5,143,611
[45] Date of Patent: Sep. 1, 1992

[54] APPARATUS FOR SEPARATING OIL FROM WATER

[75] Inventor: Alfred R. Pate, Jr., Tyler, Tex.

[73] Assignee: Summit Oil Company, Inc., Tyler, Tex.

[21] Appl. No.: 831,946

[22] Filed: Feb. 6, 1992

[51] Int. Cl.[5] ............................................. C02F 9/00
[52] U.S. Cl. .................................. 210/256; 210/259; 210/265; 210/266
[58] Field of Search ............... 210/694, 799, 801, 804, 210/256, 259, 265, 266, 513

[56] References Cited

U.S. PATENT DOCUMENTS

| | | | |
|---|---|---|---|
| 3,414,523 | 12/1968 | Jockel | 210/694 |
| 3,558,482 | 1/1971 | De Young | 210/265 |
| 4,191,651 | 3/1980 | Cheysson et al. | 210/265 |
| 4,308,136 | 12/1981 | Warne | 210/265 |
| 5,011,609 | 4/1991 | Fink | 210/799 |

OTHER PUBLICATIONS

Summit Oil Company, Inc., Con De Sep TM Oil/Water Separator, 4 pages, Tyler, Tex.

*Primary Examiner*—Ivars Cintins
*Attorney, Agent, or Firm*—Vaden, Eickenroht, Thompson, Boulware & Feather

[57] ABSTRACT

Oil and water separated from the oily condensates produced by the operation of various machinery, particularly air compressors. A large tank having turbulence-free primary and secondary separation chambers receives the oil and water mixtures and separates the oil from the water by a two-phase gravity separation. A third phase of oil and water separation is provided by an external activated carbon filter to produce a clean, sheen-free water.

4 Claims, 1 Drawing Sheet

APPARATUS FOR SEPARATING OIL FROM WATER

BACKGROUND OF THE INVENTION

This invention relates to the field of separating water from oily condensates, and it more particularly relates to separating the water and oil mixture, or condensate, of air compressors and other water-cooled machinery.

DESCRIPTION OF THE PRIOR ART

The art of separating oil and water mixtures obtained from various types of equipment is relatively new with the advent of increased environmental concern and the promulgation of stricter environmental standards, along with stiff penalties for those who do not properly dispose of oil and water mixtures. For example, air compressor condensate is now classified in many states as a hazardous waste.

The collection and disposal of oily condensate by licensed contractors is often inconvenient and expensive. Therefore, it is desirable to have a means at the location of operation of an air compressor for the separation of the oil and water mixture, or condensate, produced as a result of its operation.

A known method for collecting and separating oily condensates from air compressors involves collecting the oil and water mixture in a tank. The oil and water mixture enters the tank and passes through a dispersion bucket which allows entrained air to exit the unit. Orifices at the bottom of the dispersion bucket control the flow of the oily water and assists in producing a uniform dispersion of the condensate. The oil in the mixture coalesces and rises to the top of the tank to be removed from the surface of the "separated" water remaining in the tank. The separation process is driven by gravity. The "separated" water sinks to the bottom of the tank where it is collected by an effluent header. The water then passes through a conduit into a secondary chamber containing an activated carbon polishing unit. The separated water passes through the carbon filter in the secondary chamber and exits the tank through an outlet valve.

A limitation of the described system is that a portion of the total tank area is occupied by the canister forming the secondary chamber containing the activated carbon filter. Because the oil and water mixture entering the tank only goes through one phase of gravitational separation, a significant amount of oil remains in the water and oil mixture which is directed through the carbon filter. The active life of the carbon filter is reduced because of the quantities of oil passing through and being removed in the carbon chamber.

Another limitation of this system is that a spent activated carbon filter must be removed by entering into and disturbing the liquid in the tank. Although the carbon filter is maintained in a separate canister within the full volume of the tank, entering into the secondary chamber will cause turbulence in the entire tank as well as in the canister. By doing so, the coalesced oil at the top of the tank and the plug flow of the "separated" water will be disturbed.

Further, because the activated carbon filter occupies a portion of the total tank area, the separation capacity of this prior known system is reduced. It is always a desirable result to increase the capacity of such a system such that location of the filter in the tank represents another disadvantage of such systems.

It is the purpose of this invention, therefore, to provide an improved apparatus for separating oily water mixtures, particularly those collected from machinery such as air compressors.

Another purpose of the present invention is to provide increased residence time of the oily mixture within a tank in order to allow for a primary and secondary separation of oil from the water phase of an oil and water mixture in order to produce clean, sheen-free water.

Another purpose of the invention is to provide for an external canister containing an activated carbon filter whereby the filter can be changed without entering into the tank and disturbing the plug flow or the coalescing of the oils separated from the oily mixture entering the tank.

SUMMARY OF THE INVENTION

In accordance with this invention, there is provided a new apparatus for separating oil from water. A tank having an inlet and outlet receives a mixture of oil and water from such sources as, for example, air compressors. Connected to the inlet is a means for separating air from the oil and water mixture entering the tank. The means for separating the air from the mixture has a plurality of orifices located therein for passage of the mixture into a primary separation chamber. As the oil and water mixture enters the primary separation chamber, the oil from the oil and water mixture coalesces and rises to the top of the tank and is removed.

An effluent header located at the bottom of the primary separation chamber collects the fraction of the oil and water ("separated" water) from the primary separation chamber. The effluent header routes the separated water into a container located within the tank. The container forms a secondary separation chamber for allowing the oil in the fraction that exits the primary chamber to coalesce and rise to the top of the container. The coalesced oil is removed from the container through an orifice located near the top of the container and which also serves to equalize the oil and water mixture level of the container with that of the tank. The coalesced oil leaving the container through the orifice is then removed from the tank with the oil coalesced in the primary separation chamber. The container is isolated from the turbulence and plug flow of the oil and water mixture in the primary separation chamber.

The separated water fraction which settles to the bottom of the container forming the secondary separation chamber is routed to the outlet of the tank through a conduit. The water exiting the tank enters an external canister which contains activated carbon. The activated carbon further clarifies the water by removing additional oil and other organics.

DETAILED DESCRIPTION OF THE PREFERRED EMBODIMENT

Figure 1:
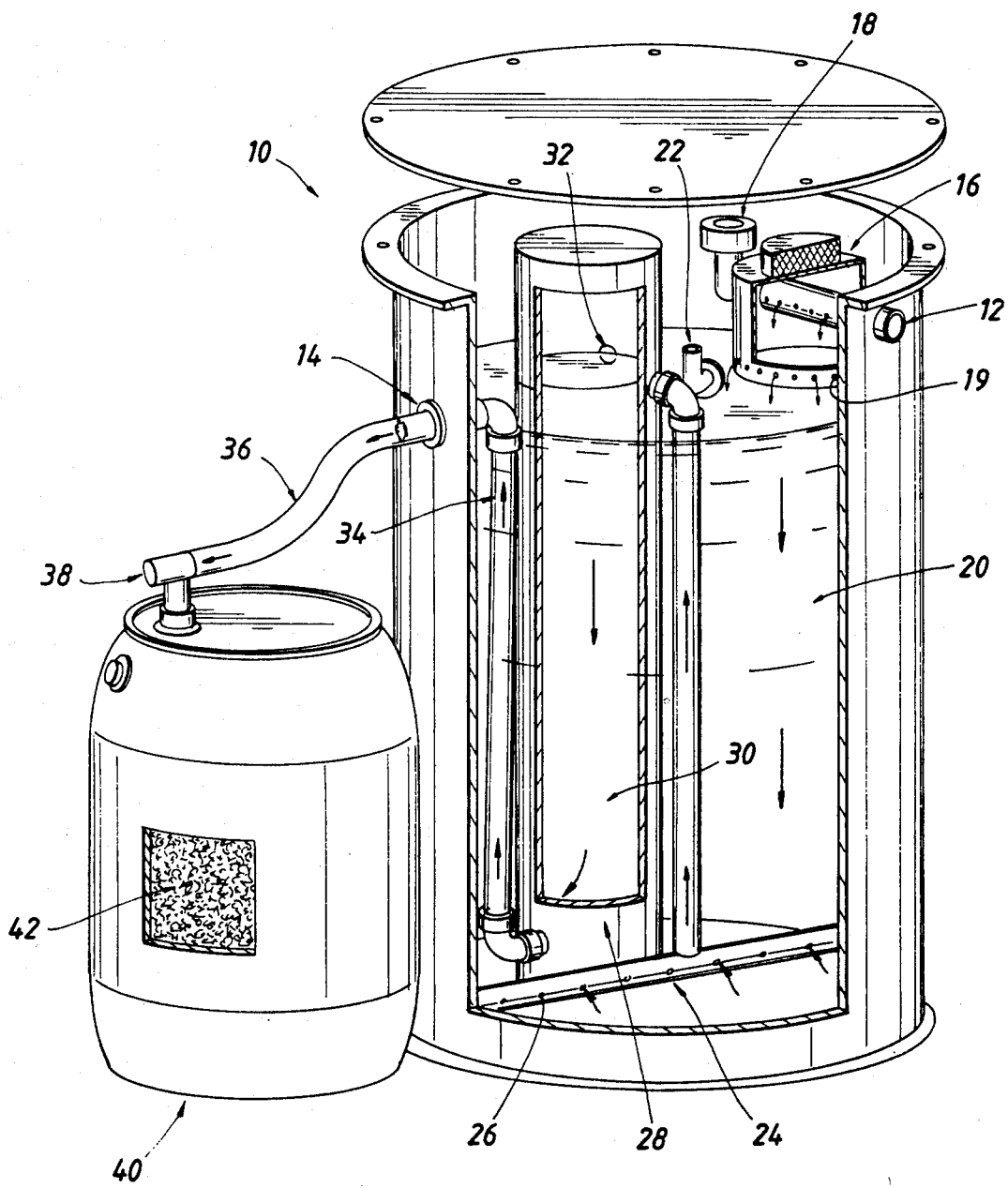
FIG. 1 is a front, partially cut-away view of a preferred embodiment of the invention.

Referring to FIG. 1, there is shown a tank 10 having an inlet 12 and an outlet 14. The tank 10 is constructed of an impact resistant material such as high density polyethylene or polypropylene. Tank 10 contains a large, turbulence-free primary separation chamber 20 and a turbulence-free secondary separation chamber 30. The separation chambers allow for two stages of gravity separation of water from oil. The large primary separation chamber 20 provides sufficient residence time for gravity to effect the separation process. The secondary separation chamber 30 provides greater turbulence-free residence time for further oil and water separation in the tank 10.

Oil and water mixtures, or oily condensates, which are produced during the operation of various machines, for instance, air compressors, enter tank 10 through inlet 12. The oil and water mixture immediately enters a dispersion bucket 16. Entrained air exits from the dispersion bucket 16 and out through a vent 18 in the tank 10. The oily water enters the primary separation chamber 20 of tank 10 through orifices 19 located along the circumference of the dispersion bucket 16. The orifices 19 control the flow of oily water thereby ensuring uniform dispersion of the oil and water mixtures. The arrows used in FIG. 1 demonstrate the flow of the oil and water mixture through the tank 10 and the various structures located within tank 10. In the primary separation chamber 20, small particles of oil coalesce, joining to form larger drops. The lower specific gravity of oil results in its rising to the top of the primary separation chamber 20. The oil then exits through coupling 22. The oil which exits through coupling 22 is collected for environmentally safe disposal. The "separated" water in the primary separation chamber 20 slowly sinks to the bottom of the primary separation chamber 20 where it is collected by an effluent header 24. The effluent header 24 ensures maximum residence time and plug flow throughout the apparatus. Water enters the effluent header 24 through a series of orifices 26 located along the header. The water collected in the effluent header 24 travels to the second stage of gravity separation where the maximum amount of gravity separable oil is removed. A container 28 forms a secondary separation chamber 30 for allowing the oil in the fraction that exits from the primary separation chamber 20 to coalesce and rise to the top of the container 28. The secondary separation chamber 30 within the container 28 provides a turbulence-free area with sufficient residence time for gravity to effect the separation process. The coalesced oil which rises to the top of the secondary separation chamber is removed by means of an orifice 32. Orifice 32 allows the oil and water mixture in the container to equalize with the oil and water mixture in the primary separation chamber 20. The water which is separated from the oil while in the secondary separation chamber 30 within container 28 slowly sinks to the bottom of container 28, and moves through conduit 34 and exits the tank 10 through outlet 14.

The separated water exiting through outlet 14 travels through a connecting tube 36 to an effluent receiving nozzle 38 located on external canister 40. The large external container contains activated carbon 42 and constitutes a filter polishing unit which provides additional absorption of particulates, oils and other organics. Locating the activated carbon 42 in the external canister 40 allows for a much greater amount of activated carbon to be available for filtering the separated water than in prior systems in which the carbon filter is located within the tank 10. An additional advantage of the present invention is that this activated carbon filter can be replaced without disturbing the liquids undergoing separation in tank 10. This third separation phase provides clean, sheen-free water having less than 15 ppm of oil. For most states, 50 ppm is currently the standard concentration of oil allowed in water destined for sanitary sewers.

From the foregoing, it is obvious that there has been provided a novel apparatus for separating oil from water. It will be appreciated that certain changes or alterations in the present apparatus may be made without parting from the spirit of this invention. These changes are contemplated by and are within the scope of the appended claims which define the invention. Additionally the present description is intended to be taken as an illustration of this invention.

What is claimed is:

1. An apparatus for separating oil from water, which comprises:

a tank forming a primary separation chamber having an inlet for receiving a mixture of oil and water and an outlet;

means in said tank connected to the inlet for separating air from the mixture of oil and water and having a plurality of orifices located therein for passage of the mixture of oil and water into the primary separation chamber in the tank for allowing the oil to coalesce and rise to the top of said tank for removal from the primary separation chamber;

a container located in said tank for forming a secondary separation chamber for allowing the oil in the fraction that exits from the primary separation chamber to coalesce and rise to the top of said container for removal therefrom, the fraction that exits from the primary separation chamber being isolated from the turbulence and flow of the oil and water mixture in the primary separation chamber when in said container;

an effluent header located at the bottom of the primary separation chamber for collecting the fraction that exits from the primary separation chamber and for routing the fraction into said container for secondary separation;

a conduit for routing the water which settles to the bottom of said container to the outlet of said tank; and an external canister having activated carbon therein connected to the outlet of said tank for filtering the water exiting from said tank through the activated carbon to remove organics therefrom.

2. The apparatus of claim 1, wherein the means for separating air from the mixture of oil and water is provided with a vent for emitting air.

3. The apparatus of claim 1, wherein said primary separation chamber is provided with a coupling for providing access for removal of coalesced oil therefrom.

4. The apparatus of claim 1, wherein said container is provided with an opening for providing access for removal of coalesced oil from the secondary separation chamber.

* * * * *